United States Patent [19]

Bitzer et al.

[11] Patent Number: 4,793,813

[45] Date of Patent: Dec. 27, 1988

[54] COMPUTER-BASED EDUCATION SYSTEM

[75] Inventors: David L. Bitzer; John E. Stifle; Michael W. Walker, all of Urbana; Clarence E. Kelley, Champaign; Donald D. Pakey, Champaign; Donald A. Lee, Champaign, all of Ill.

[73] Assignee: The Board of Trustees of the University of Illinois, Urbana, Ill.

[21] Appl. No.: 787,542

[22] Filed: Oct. 15, 1985

[51] Int. Cl.$^4$ .............................................. G09B 7/00
[52] U.S. Cl. .................................. 434/335; 434/351; 364/900
[58] Field of Search ... 364/200 MS File, 900 MS File; 370/104; 342/352-356; 178/2 E; 434/118, 365, 335, 323, 307, 350, 351, 322, 327, 335; 455/2, 3, 5; 340/717; 379/90, 93, 96

[56] References Cited

U.S. PATENT DOCUMENTS

| | | | |
|---|---|---|---|
| 3,405,457 | 10/1968 | Bitzer et al. | 340/706 |
| 3,818,453 | 6/1974 | Schmidt et al. | 364/900 |
| 4,422,171 | 12/1983 | Wortley et al. | 371/32 |
| 4,480,328 | 10/1984 | Alaria et al. | 370/63 X |
| 4,625,308 | 11/1986 | Kim et al. | 370/104 |
| 4,768,087 | 8/1988 | Taub et al. | 358/84 |

OTHER PUBLICATIONS

"The ATS-6 Health Education Telecommunication (HET) Experiment", by Janky et al., Appearing in Communications Satellite Systems: An Overview of the Technology, pp. 7-12, 1976, IEEE Press.

"An Electronic University", by Lionel V. Baldwin, Appearing in Nov. 1984 Issue of Spectrum, pp. 108-110.

Primary Examiner—Gareth D. Shaw
Assistant Examiner—Paul Kulik
Attorney, Agent, or Firm—Perman & Green

[57] ABSTRACT

A rapidly responsive, computer-based education system is described wherein a large central computer which is adapted to store and execute educational software and to provide a high speed data output stream of multiplexed data frames, communicates with a plurality of remotely located, keyboard actuated display terminals. Communications are accomplished in the forward channel via a satellite link with reverse channel communications being via one or more dedicated telephone lines. The forward channel satellite link is able to accept data at multi megabit rates and to service tens of thousands of user terminals per satellite transponder. The reverse channel telephone line, while only able to accept data rates in the kilobit per second range, accommodates outputs from hundreds of user operated terminals because of the low data rates generated by user operated terminals.

15 Claims, 4 Drawing Sheets

COMPUTER-BASED EDUCATION SYSTEM

BACKGROUND OF THE INVENTION

This invention relates to data communication systems and more particularly to data communication systems in a computer based education (CBE) environment.

CBE has been in development for the past 25 years and in use, on a limited basis, for the past 20 years. The acknowledged state of the art in CBE is the PLATO system which was first developed at the University of Illinois and is described in U.S. Pat. No. 3,405,457, the contents of which are incorporated herein by reference.

A number of articles have considered various aspects of the PLATO System and its viability in CBE, e.g. see: "Advances in Computer-based Education" by Alpert and Bitzer, *Science,* 167 1582–1590 (March 1970)

PLATO is a large, main-frame central processor system which can service over a thousand connected display terminals on a real-time, interactive basis. The central processor makes available to the student/user tens of thousands of hours of courses in a variety of subject areas, in the form of pedagogical material displayed on the students' terminals.

The student typically has available an electronic display (such as a CRT) and a keyboard. Information is presented in the form of text and/or graphical matter (akin to a textbook). The student, via a keyboard, can respond by indicating he/she has completed review of the material being presented and is ready for presentation of additional material. The student can further manifest an understanding of the material by responding to questions and the like.

Speed of response by the central computer to student questions and instructions is of great importance: students will not sit idly by while the machine spends many seconds in presenting a new display, or responding to keyboard operations. In short, successful CBE interaction requires fractional second response and correspondingly fast screen displays.

Terminals employed in the PLATO systems may be relatively "dumb", in that most application programs are executed in the central computer while display programs are executed in the terminal. Most data transmission between the central computer and associated terminals consists of transmitting to the terminal, via telephone lines, information necessary to produce a display, and transmitting from the terminal to the computer on the same lines, the user's keyboard entries.

Several major cost factors have historically mitigated against making central computer CBE services available, on an economic basis, to the potential mass of users. The first has been the intrinsic hardware costs of the central processors and allied equipment. In the recent years, however, equipment providing comparable and in many cases, better performance have been produced at highly reduced costs through technological innovation. However, the other major cost element, communications, have not decreased and in some cases have increased.

Telephone line tariffs characteristically double or triple the basic cost of a terminal's monthly connection charge. For instance while it is not unusual to pay between $250–$500 per terminal per month for access to a central computer CBE system, telephone line charges can raise that monthly cost to $1000–$1200 per terminal per month. These high communication charges are present even though a number of terminals may share a single telephone line.

The limiting factor to the number of terminals that can share a telephone line is the data rate which the line can accommodate (e.g. 9600 bits per second). Characteristically in a CBE system, it is forward channel data flow (ie. computer to terminal) which controls rather than reverse channel data flow (i.e. terminal to computer). For instance, forward channel data flow in a PLATO CBE system averages 250–300 bits per second per terminal. With a loading factor of approximately 0.7 on a 9600 bps line, 16 to 20 terminals can be multiplexed on a single telephone line. In contrast, reverse channel data flow in such a system is much slower, averaging less than 20 bits per second per/terminal. This low rate of data transmission is a result of the reverse channel data flow being almost exclusively keystroke data to which is appended proper routing information.

Another factor which has limited the number of terminals connected to a telephone line is the rapid response time required to satisfy the user. A successful system should appear to the student to give "instantaneous" replies to the student's queries and instructions. This response characteristic requires that there be little or no queueing, polling or other communications protocols which require the user to sit and wait for a "turn". An average system response time to the student of a few tenths of a second (e.g. approximately 0.3 sec) needs to be attained before a system can truly be called "interactive".

In order to reduce communications costs inherent in present central processor based CBE systems, modes of data transmission other than telephone lines have been explored. In U.S. Pat. No. 4,633,462, a protocol for the use of existing CATV communication channels is described which preserves the rapid response time to the user.

Forward channel data transmission using locally generated television style signals have also been employed by the PLATO system at the University of Illinois with reverse channel communications being via telephone lines. That system employed a time slotted, data transmission protocol which greatly reduced the amount of traffic that could be handled. In specific, each terminal in the system was allocated a time slot and the TV signal was multiplexed on a time division basis. Thus, if there was no data to be transmitted to a terminal or less data than the time division could accommodate, the empty portion of the time slot was wasted. That system was very limited in the number of terminals it could accommodate. Furthermore, the TV signal generation was essentially line of sight, limited the potential user base, and was costly since it had to be reproduced at each central site along with all of the other central computing apparatus.

Another communication mode, i.e. via satellite has been explored. Until recently satellite transponder space has been scarce and costly. This is no longer the case. A T1 channel (1.544 megabits/sec) is now available at reasonable cost. However, the equipment for communicating with a satellite is expensive. For instance, at both ends of the communications channel in a classical satellite system, combined up-link and down-link antennas are required to enable two-way communications. An uplink antenna and allied electronics is costly and may approach $300,000 per installation. The downlink receiver is an order of magnitude less expensive. To attempt to distribute CBE data via satellite using a standard installations would require a costly up-link at every site where there exists a substantial user terminal population. Moreover, and equally a problem, the time delay for unilateral data transmission through a stationary satellite is approximately 0.25 seconds. Since the data would traverse both the forward and reverse channel directions in such a system, the total time delay would be on the order of 0.5 to 0.6 secs—almost double what is perceived to be acceptable to the user.

Accordingly, it is an object of this invention to provide an improved CBE system wherein communications are accomplished in the most economical manner.

It is another object of this invention to provide an improved CBE system which employs satellite data transmission and still retains an optimum speed of response for the user.

It is a further object of this invention to provide a central computer-based CBE system wherein a plurality of remote CBE sites may be served economically via satellite from a central site.

SUMMARY OF THE INVENTION

A rapidly responsive, CBE system is described whose interactions are precisely targeted to the computer/human user relationship rather than a computer/computer relationship. In that regard, a large central computer which is adapted to store and execute educational software and to provide a high speed data output stream, communicates with a plurality of remotely located, keyboard actuated display terminals. Communications in the forward channel are carried out via a satellite link with the reverse channel being via one or more dedicated land based links (e.g. telephone lines). The forward channel satellite link is able to accept data at multi megabit rates and to service tens of thousands of user terminals per satellite transponder. The reverse channel link, while only able to accept data rates in the kilobit per second range is able to accommodate the outputs from hundreds of user operated terminals because of the low data rates produced by user operated terminals.

DETAILED DESCRIPTION OF THE INVENTION

The CBE system embodying the invention will now be described with reference to each of the FIGS. Initially, the overall system configuration will be considered and its operation on a global level detailed. Subsequently, each of the major subassemblies will be described along with their communication protocols. Finally the system's protocols and data formats will be discussed enabling a full understanding of the invention.

Figure 1:
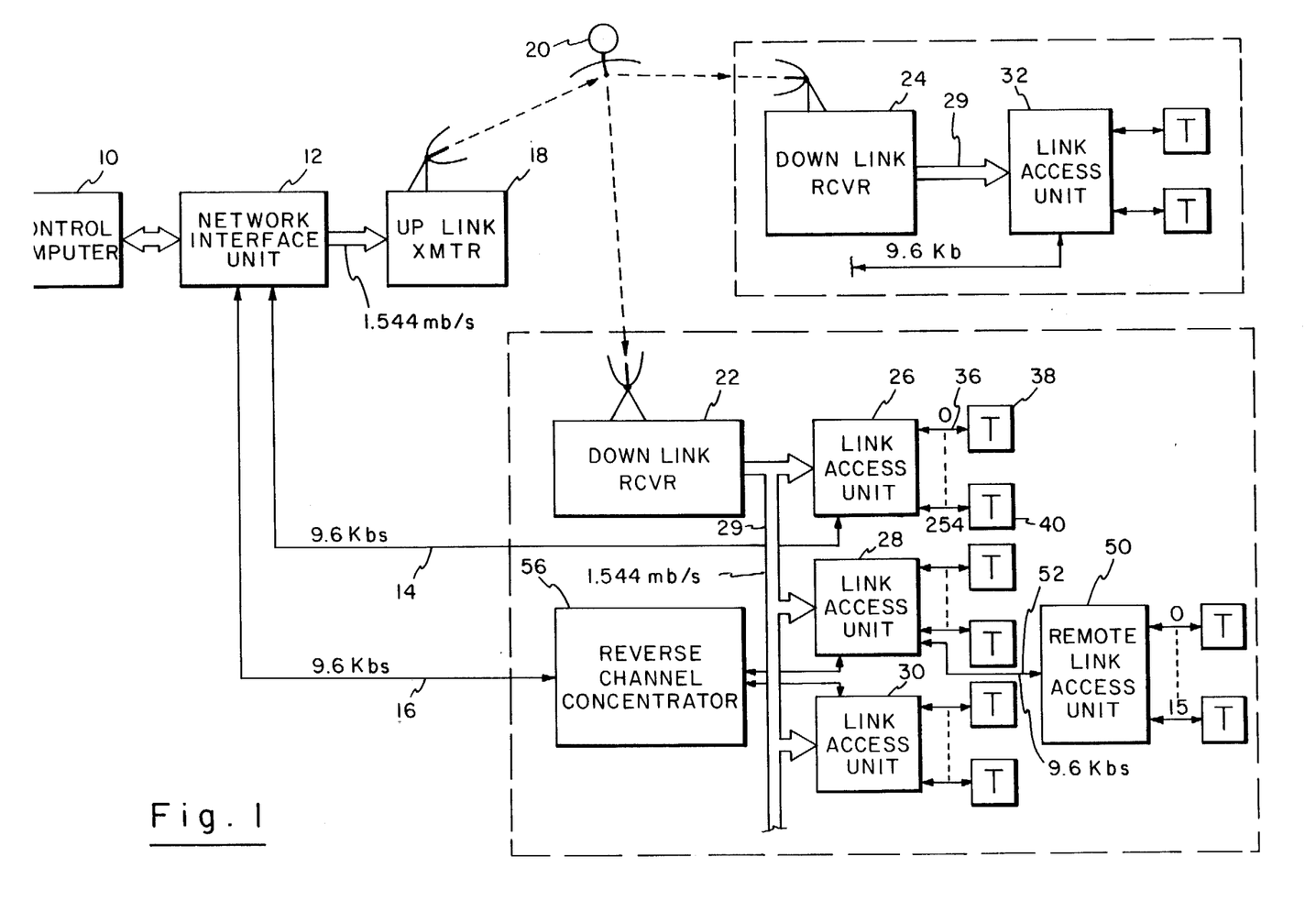
FIG. 1 is a block diagram showing a CBE system configured in accordance with the invention.

Referring to FIG. 1, central computer 10 is a mainframe, high speed, central processor with allied peripherals e.g. disk drives, extended memory, etc. that enable it to provide educational materials of a sophisticated nature to individual student users. Substantially all of the system's lesson execution, processing, statistical analysis, and other data processing is accomplished within central computer 10. The output from central computer 10 is essentially display code and supervisory instructions for the network. Display code is that code which instructs a student's terminal on the format and content of information to be displayed on its display screen. This enables the amount of data flow per terminal to be kept to a minimum and requires that the major processing be accomplished within central computer 10.

Notwithstanding the fact that central computer 10 provides, in the main, display code, it can be statistically shown that each terminal communicating with central computer 10 requires, on the average, 250 bits per second of forward channel data. In contrast, the reverse channel data which is, in the main, keystroke information, requires approximately 20 bits per second per terminal.

Central computer 10 communicates with the network via network interface unit (NIU) 12. NIU 12 performs a number of tasks. It meters data output to assure that no downstream device is overrun with data it cannot handle and insures a fair allocation of bandwidth amongst the terminals at each contention point in the network. NIU 12 is not responsible for storing large amounts of data. That task falls to central computer 10 which provides data for a particular terminal only when given permission by NIU 12. NIU 12 further receives all reverse channel data via telephone lines (14 and 16, for example) and further has encryption capability should it be so required for the forward data channel traffic.

Figure 2:
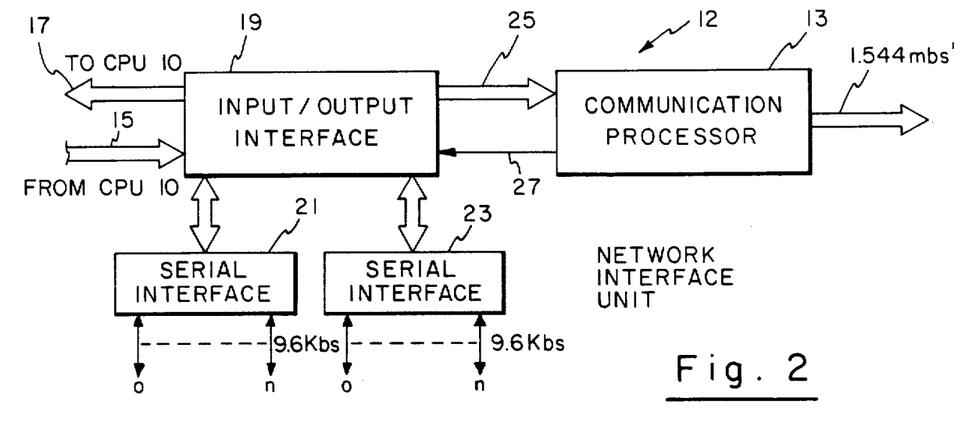
FIG. 2 is a block diagram of the Network Interface Unit (NIU).

Referring now to FIG. 2, NIU 12 receives forward channel data from CPU 30 via bus 15. Reverse channel data is fed to CPU 10 via bus 17. Input/output interface unit 19 is essentially a dual ported memory or buffer which sends and receives 64 bit words to and from CPU 10; receives and stores 16 bit words from serial interface units 21, 23 and sends and receives 16 bit words to and from communication processor 13 via bus 25 as the result of control commands received over line 27. Communication processor 13 is preferably a Heurikon HK 68/M10 processor with associated random access memory and controller modules. processor 13 configures the T-1 1.544 mbs signal by allocating data according to established guide lines for each downstream device in the network and assures that no device will be overrun with data.

As will be described in further detail hereinafter, forward channel data is configured in frames of limited data content, which frames are multiplexed and transmitted in an unbroken stream to using terminals. The individual frames are sorted by downstream devices in accordance with header information contained therein. This method of data transmission is efficient and enables a T-1 carrier to accommodate the data flow for up to four thousand simultaneously operating terminals.

Referring back to FIG. 1, the output from NIU 12 is fed to uplink transmitter 18 which in turn transmits a 1.544 megabit per second T-1 signal to stationary satellite 20. Satellite 20 redirects the signal to a number of remotely located downlink receivers 22,24 etc. Each downlink receiver impresses the T-1 signal on an associated bus 29 which in turn feeds the signal to one or more link access units (LAU) 26, 28, 30, 32, etc. Each LAU provides access to the network for up to 255 "ports". As an example, LAU 26 provides 255 output lines 36, each output line being termed a "port". Each port may accommodate one or more terminals 38, 40, etc. depending upon their constancy of usage. Each LAU recovers forward traffic from its input bus and, in addition, concentrates reverse channel traffic from each of the terminals for transmission onto a dedicated phone line (e.g. phone line 14). Ports 36 may be operated in either a dedicated or dial-up mode—that is that they may be either hard wired or connected via a dial-up telephone network to the individual terminals.

Where subscriber density is too low to justify the use of an LAU, a remote link access unit (RLAU) 50 may be employed. An RLAU is connected to an LAU via a full duplex 9600 bit per second circuit 52 and is capable of providing service for up to 16 subscribers. Sixteen RLAU's may be attached to a single LAU. A reverse channel concentrator (RCC) 56 is optional and may be used to concentrate the reverse traffic streams from up to three LAU's (765 subscribers). It is intended for use in areas where more than one LAU is located. The concentrated traffic stream from the RCC 56 is returned to NIU 12 on dedicated telephone line 16.

The operation of the system shown in FIG. 1 is as follows: A student signs on at a terminal, e.g. 38. That sign-on information is passed by LAU 26 via telephone line 14 to NIU 12. NIU 12 passes the sign-on data into central computer 10 which then initiates a request to terminal 38 to indicate the desired lesson. The request from central computer 10 is fed via NIU 12 to uplink transmitter 18 and via satellite 20 to all downlink receivers 22, 24. The central computer request is properly addressed so that only LAU 26 associated with terminal 38 acquires the request and passes it to terminal 38. An interaction is then set up wherein the student provides requests and answers via the return dedicated telephone line and the data from central computer 10 is fed to terminal 38 via satellite link 20.

The economics of the above described method of data flow are striking when compared to previous systems. As aforesaid, it is not at all unusual for the cost of telephone communications to far exceed the monthly fee for a CBE service. In the present satellite-based system, and assuming a population of approximately 6,000 subscribers, it can be shown that the entire cost of communications, on a monthly basis per terminal, will not exceed $10-$12. That low cost is due, in the main, to two effects—the availability of transponder space at an approximate rental of $10,000 per month and the availability of dedicated leased lines at a rental of $1.25-$1.50 per month per mile. As aforedescribed, in previous CBE systems which solely employ the telephone network, the relatively high forward channel data rate caused an artificial limit to be placed upon the number of terminals which could be connected to a single line—even though the reverse channel data flow requirements per terminal were an order of magnitude lower. This invention, by (1) diverting the high data flow, forward channel traffic through a wide band network (which can service tens of thousands of terminals simultaneously over a vast geographic area) and (2) using relatively narrow band telephone lines for reverse channel data flow, enables the intrinsic capabilities of both data communications systems to be maximized. It is important to understand that this communication protocol is most effective where the terminal's data flow into the network is at a relatively low level—e.g. keystroke data being provided by a human operator. More specifically, this system operates in a manner precisely designed to optimize the human—computer data communications link as contrasted to computer to computer data communications.

Figure 3:
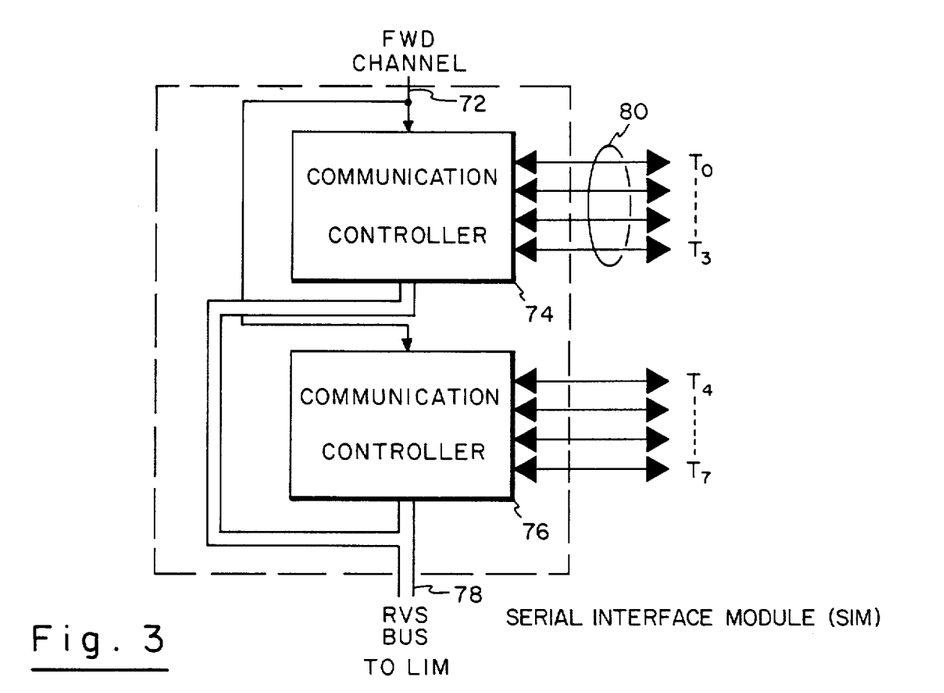
FIG. 3 is a block diagram of a Standard Interface Module (SIM) used to construct the system shown in FIG. 1.

The subassemblies employed to construct the LAU's, RLAU's, and RCC's will now be described. Two basic modules are employed: a serial interface module (SIM) 70, shown in FIG. 3 and a link interface module (LIM) 100 shown in FIG. 4. Each LIM is used to connect SIM's to the network, while each SIM provides ports to connect subscribers and a reverse channel interface. Referring now to FIG. 3, SIM 70 is fed via a forward channel interconnect 72 in parallel into a pair of communication controllers 74 and 76. Their outputs are fed to reverse channel bus 78. Input/output lines 80 from each of communication controllers 74 and 76 connect to individual terminals and control their data flow. Each of communication controllers 74 and 76 is shown in further detail in FIG. 3a.

Figure 3A:
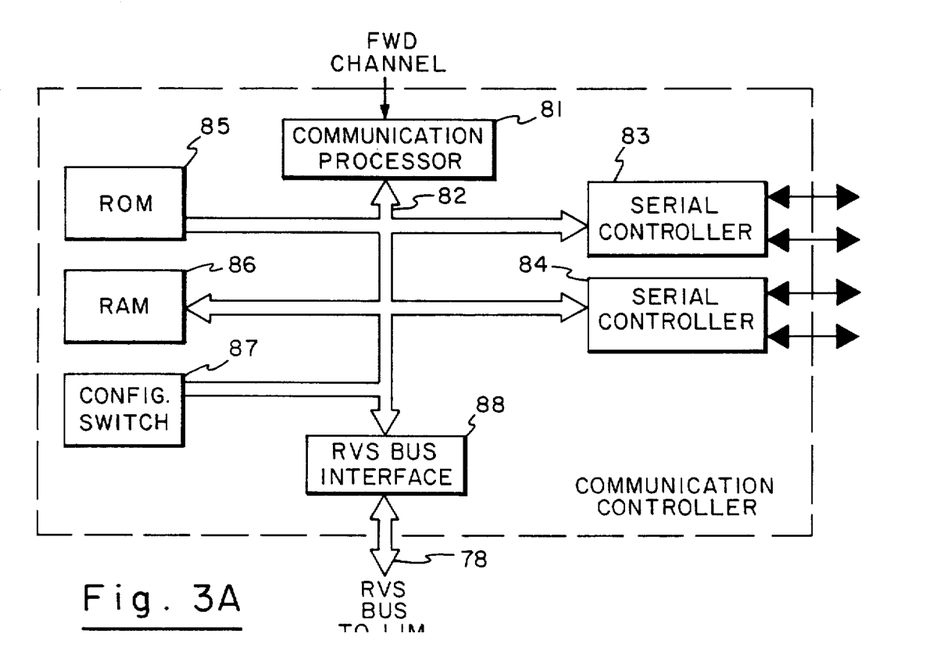
FIG. 3a is a more detailed block diagram of the communication controller portion of FIG. 2.

Each comprises a communication processor 81 connected via a bus arrangement 82 to a pair of serial controllers 83, 84. Each serial controller can connect to two terminals. Read only memory (ROM) 85 stores the program control for communications processor 81 whereas random access memory (RAM) 86 is employed to store data being sent to and from the terminals. Finally, each communication controller is provided with a reverse bus interface module 88 which accepts reverse traffic and places it onto the reverse channel bus 78. Each communication processor 81 is preferably an 8344 Communication Controller produced by the Intel Corporation. Serial controllers 83, 84 are preferably 8274 Multiprotocol Serial Controllers also produced by the Intel Corporation.

Each SIM performs a number of functions. It recovers information from the forward channel; stores it; and transmits it to one of the terminals it services. Reverse channel information received from an associated terminal is also stored and transmitted via the reverse bus interface onto the reverse channel bus. Depending upon the setting of configuration switch 87, it may also act as a multiplex concentrator wherein it concentrates information for up to 16 terminals onto a single phone line. In the multiplex mode, all information is restricted to one port (e.g. $T_0$) and the other seven ports ($T_1$-$T_7$) are unused.

Reverse bus interface 88 accepts reverse channel traffic from communication processor 81 and places it onto the reverse bus 78. Reverse bus 78 contains a "loaded" line which, when energized, inhibits any transfer of information onto bus 78. Only when the loaded status line is not energized can reverse bus interface 88 have access to the reverse bus 78.

Figure 4:
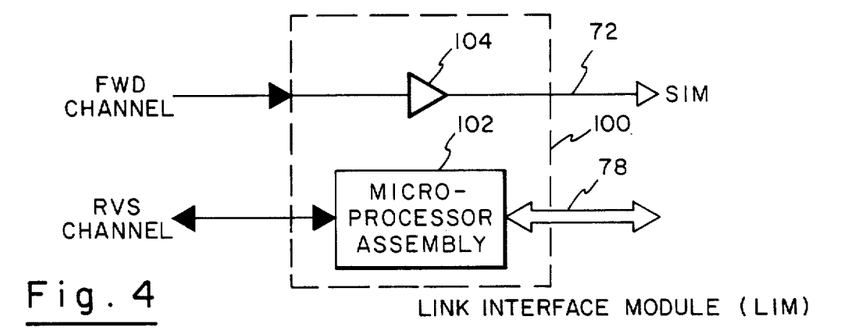
FIG. 4 is another standard subassembly, the Link Interface Module (LIM), used in the construction of the invention of FIG. 1.

Referring now to FIG. 4, a link interface module (LIM) contains two subassemblies—microprocessor assembly 102 and amplifier 104. Amplifier 104 merely buffers the forward channel and provides power gain for all incoming traffic to drive its interconnected SIMs. Microprocessor assembly 102 is connected in the reverse channel and concentrates all reverse traffic from its interconnected SIMs and passes it onto the reverse channel.

Figure 4A:
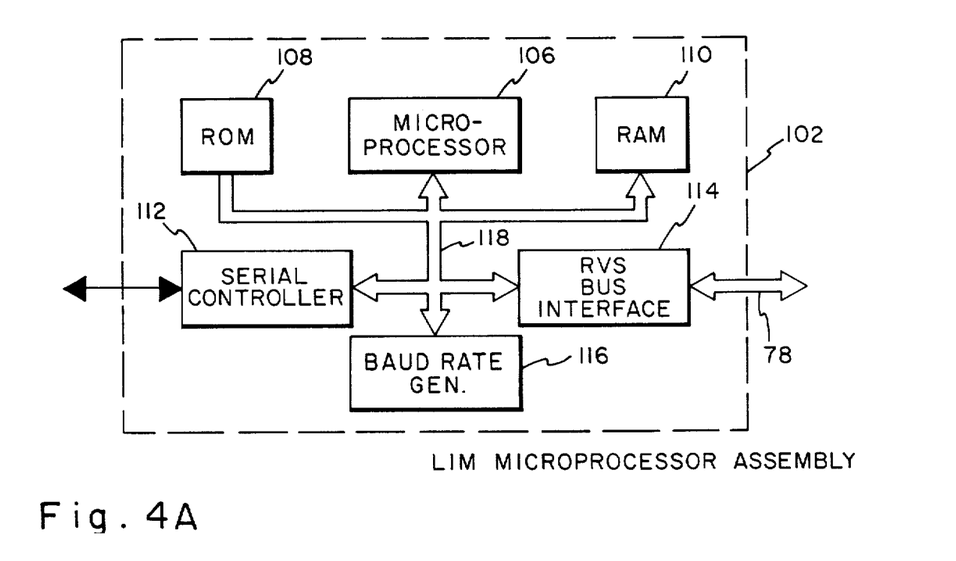
FIG. 4a is a more detailed block of the microprocessor assembly shown in FIG. 3.

The details of microprocessor assembly 102 are shown in FIG. 4a and include microprocessor 106, read only memory 108, random access memory 110, serial controller 112, reverse bus interface 114, and baud rate generator 116. All of these units are interconnected via bus assembly 118. Microprocessor, 106 via reverse bus interface 114, polls each connected SIM to determine if it has data awaiting transmission. If so, it accepts that data and stores it in RAM 110. If the attached SIM has no data, it proceeds on to the next SIM until it has completed a full circuit. Baud rate generator 116 is, in essence, a four frequency generator which is adapted to generate clock pulses at the rates of 1200, 2400, 4800 and 9600 bits per second. These four clock rates are continuously generated and applied by reverse bus interface 114 to reverse bus 78. Each SIM may select one of the four baud rates. Each port of a SIM can be remotely configured to accept one of those baud rates and to transmit and receive data at such a rate.

Figure 5:
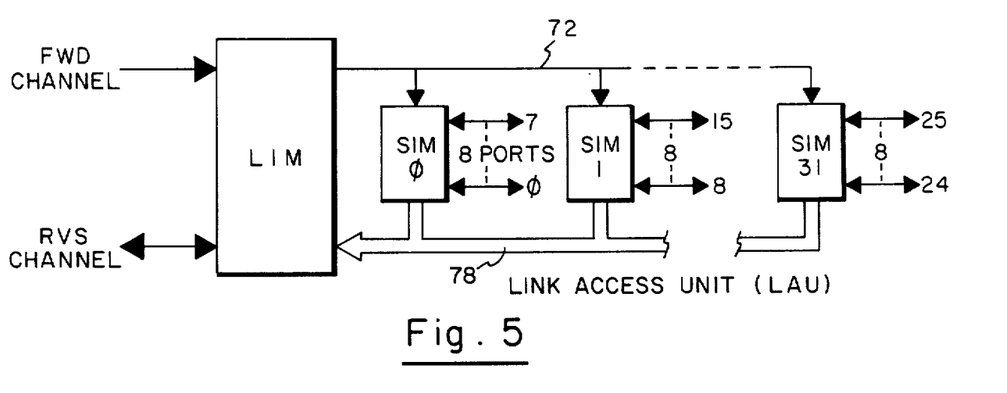
FIG. 5 is a detailed block diagram of the link access unit (LAU).

Referring now to FIG. 5, a link access unit (LAU) is shown. As aforestated, the LAU recovers forward traffic from the T-1 data link and concentrates reverse traffic for transmission onto the reverse channel. Each LAU is comprised of a plurality of SIM modules connected between forward channel conductor 72 and reverse channel bus 78. It will be recalled that each LIM merely acts as a power amplifier for forward channel data with the data routing function being accomplished in each individual SIM. Each LAU, as aforestated, is capable of controlling ingress and egress of data from up to 255 separate ports.

Figure 6:
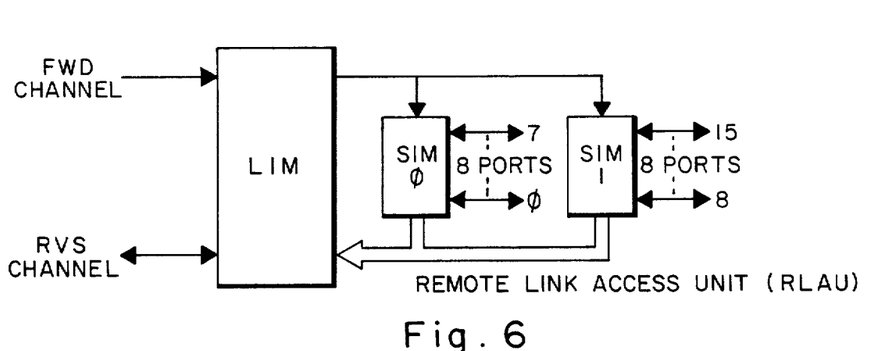
FIG. 6 is a detailed block diagram of the remote link access unit (RLAU).
Figure 7:
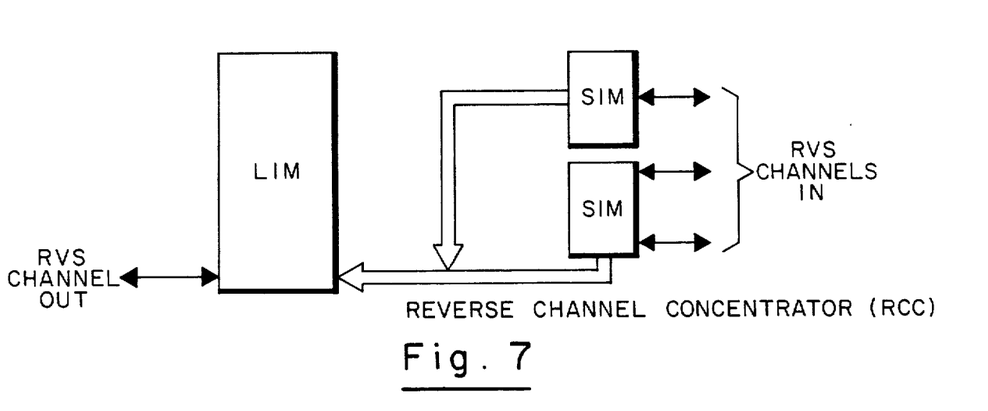
FIG. 7 is a block diagram of the reverse channel concentrator (RCC).

As shown in FIG. 6, a remote link access unit, (RLAU) is essentially an LAU which has been configured to enable connection of only 16 ports. An RLAU, as aforestated, is used for remote installations having few terminals. It functions in a substantially identical manner to the LAU. The reverse channel concentrator (RCC) is shown in FIG. 6, and essentially includes two SIM modules feeding into a LIM module. The function of the reverse channel concentrator is to combine the outputs from a plurality of LAUs and to concentrate their data flow onto a single dedicated telephone line.

All data communication within the system occurs through the use of frames which contain one or more bytes of message traffic. To reduce unnecessary data traffic, all forward channel transmissions are assumed to have been correctly received unless a negative acknowledgement is received within a reasonable period of time—which period of time is greater than the maximum loop transmission time. An alternative acknowledgement protocol, which reduces required data flow, also assumes that all transmissions have been correctly received (unless a negative acknowledgement has been received); however, upon reaching a preset frame count, a supervisory frame is invariably sent requesting a positive acknowledgement of receipt. Thus the integrity of the communication channel is positively tested on an intermittent basis. These forward channel implicit acknowledgement protocols are critical because of the significant reduction in required data flow as compared to systems which positively acknowledge each frame. On the reverse channel, data loading is considerably lighter and the protocol calls for all frames to be specifically acknowledged with the originating station retaining the original traffic until it has been correctly received at the receiving station.

Frames are of two types—information (I) or supervisory (S). I frames contain subscriber traffic while S frames contain supervisory data for controlling the network. In the forward channel all I frames are transmitted through the satellite link and via LAUs to the specifically addressed ports. Supervisory frames are likewise transmitted by the satellite link to the LAU's for supervisory channel control. On the reverse channel, all I frames from the terminals to the central computer are transmitted over dedicated telephone lines as are some supervisory frames from various of the system components. In this instance, however, some of the reverse channel supervisory frames are also transmitted in the forward direction for reverse channel supervisory control. It is of interest to note that in most cases, leased lines are available on a full duplex basis at no extra charge thereby enabling some reverse channel supervisory activities to occur in the reverse direction at no extra expense.

Forward channel traffic is packaged in frames of the following format:

F = flag byte
AL = LAU address byte
Ap = port address byte
C = Control byte
I = Information field
FCS = Frame check bytes All frames begin and end with a flag byte which is further used to maintain frame synchronization. A single flag byte may act as the closing flag for one frame and the opening for the next frame. It is the only frame which may contain 6 contiguous one bits.

The AL address byte specifies which LAU is to receive the specific frame. LAU addresses may range from 0 to 254 with address 255 being a global address which will be accepted by all LAUs present on the network. On LAU/RLAU links, the addressed LAU strips the byte from the frame before passing the frame to the associated RLAU. The Ap address byte specifies which port on an LAU (or RLAU) is to receive the frame. Port addresses range from 0 to 254 with address 255 being a global port address which instructs the LAU or RLAU to deliver the frame to all ports.

The C control byte specifies the frame type and sequence number. As aforestated, frames may be either of two types, information or supervisory. A portion of this byte contains the frame send sequence number N(S) in information frames or the supervisory function in supervisory frames. In the preferred mode of operation, information frames are numbered sequentially from 0 to 63 whereas supervisory frames contain no sequence number.

The forward channel I information field contains the traffic or supervisory information as specified by the C control byte. This field may contain many bytes (e.g. up to 64) although it is ordinarily limited to a maximum of 12 bytes of traffic. It is important that the traffic be limited to small segments as this enables the system to operate with a minimum of delay perceivable at the user's terminal. If the NIU was to transmit at one time long data segments to a single terminal, downstream terminals would have to wait until the upstream terminal's traffic was received. To prevent this, network interface unit 12 regulates the output from central computer 10 to limit the number of bytes of traffic per frame (and the number of frames per second) in the forward channel. Thus, since the forward channel is able to accept data at a 1.5 megabit per second rate, the users perceive no delay in the forward channel data as it is displayed on their terminals.

The identical problem exists in the reverse channel. Each terminal's traffic is entered into a buffer in its associated LAU. The LAU polls each of the buffers and, notwithstanding the number of data bytes residing therein, will accept no more than 12 bytes for transmission back to NIU 12 before moving on to the next buffer and its data. Thus while the frame's size allows for much bigger data segments, the system in both the forward and reverse channels, limits itself to discrete segments of data precisely to avoid response time degradation to the user. This is in contrast to prior art network protocols which have attempted to make the most efficient use of bandwidth by attaching as much data as possible to the "header" information to reduce the header-to-data ratio. That, however, results in a longer delay per frame and causes unacceptable user delays.

Supervisory frame types perform a number of functions important to the proper operation of the system. For instance, a supervisory frame may indicate that the reverse channel receiver is ready; that the reverse channel receiver is not ready; that a sequence error has been sensed on the reverse channel, that an addressed forward channel box should clear an error state indication, that data is to be encrypted, etc.

The FCS frame check byte contains a code which checks the frame content beginning with the first byte of the LAU address byte and ending with the last byte of the information field. These bytes may use the cyclic redundancy check (CRC) which is well known in the art.

Each port in the network maintains a received sequence number N(R). This number is the expected number of the next to be received frame. That number is incremented by one for each frame received without a CRC error. A sequence error occurs if a frame arrives containing a sequence number N(S) which does not match N(R). If a CRC error is detected, the frame is discarded and a sequence error will eventually occur. The port rejects any frame which does not have the proper N(R). A port will, however, respond to supervisory frames following a sequence error thus permitting network control to be maintained.

The occurrence of sequence error causes the LAU to send via the reverse channel a "forward channel sequence error" packet to NIU 12 which contains the N(R) of the expected frame. In the preferred mode, this transmission is repeated every one-half second until the error condition is cleared. NIU 12 maintains a send sequence number N(S) and a copy of N(R) for each port in the network. N(S) is incremented by one after every frame is transmitted. NIU 12 may request an updated copy of N(R) by sending a supervisory requesting such information. The port so addressed responds with an updated N(R). NIU 12 maintains a copy of the last two seconds of traffic, and, if no error is reported at that time, the oldest frames are discarded and new frames are added to the record.

With respect to the reverse channel, somewhat different frame configurations are employed. Except on LAU/RLAU links, all reverse channels are full duplex. The primary reverse channel carries traffic towards NIU 12 while the secondary reverse channel carries supervisory information in the forward direction and is used to control the flow of traffic on the primary reverse channel. On LAU/RLAU links, the forward channel carries supervisory information also. primary reverse channel traffic is packaged in frames in the following format:

F = flag byte
C = Control byte
I = Information field
FCS = Frame check sequence

The F flag and FCS frame check sequence bytes are identical in form and function as in the forward channel frames. The C control byte specifies the frame type and includes the frame's "send sequence number" N(S) in information frames or the supervisory function in supervisory frames. I frames are numbered sequentially from 0 through 63, while supervisory frames contain no sequence number. One bit in this byte is a poll bit. Receipt of a frame with this bit set to the one state requests that the receiving station respond with a frame containing the receive sequence number N(R).

Reverse channel supervisory frames are transmitted on the secondary reverse channel and are employed to control the operation between various units on the channel. One such frame is the "RRR" supervisory frame which specifies that the primary reverse channel receiver is ready to receive traffic. The information field in that frame contains the receive sequence number N(R) of the station sending "RRR". This frame is normally transmitted upon receipt of a frame on the primary reverse channel with a poll bit set. This frame is an acknowledgement that the station sending "RRR" has correctly received all frames through N(R−1) and is prepared to receive additional frames.

An "RRNR" supervisory frames specifies that the primary reverse channel receiver is temporarily unable to receive additional frames. This frame is normally transmitted upon the occurrence of a busy condition such as "receive buffer full". An "RREJ" (reverse channel reject) supervisory frame is used to indicate that the station sending such frame has received a frame on the primary reverse channel containing a send sequence number N(S) which did not match the expected number N(R). The information field in that frame contains the N(S) of the expected frame.

Turning now to the I information field format as employed on the reverse channel, such may contain one or more bytes of reverse traffic (i.e. "packets") or supervisory data. packets from several subscribers may be present in the same frame. The packet format is as follows:

T = packet type

A = Subscriber port address
I = Traffic

The T "type" information portion of each packet differs dependent on whether the packet is information or supervisory. If the packet is information, the data in the T portion of the packet may indicate that it is "High priority Reverse Traffic" or that it is "Low priority Reverse Traffic". If the T portion of the packet is supervisory, it may indicate that the forward channel receiver is either ready or not ready or that a forward channel sequence error has ben detected.

An "FRR" type packet (forward reverse channel ready) specifies that the forward channel receiver is ready to receive traffic. The I field in the packet contains the forward channel sequence number N(R) of the port specified by the address byte. This packet is normally transmitted upon a receipt of a POLL frame on the forward channel. This packet is an acknowledgement that the port sending the FRR packet has received all previously transmitted forward channel frames. The FRR packet is also used to indicate when a port is ready to resume receiving traffic following a temporary busy condition.

An "FRNR" packet (forward reverse channel not ready) specifies that the forward channel receiver is temporarily unable to receive additional information frames. This packet along with the FRR packet together provide the means of implementing forward channel flow control. Finally, an "FREJ" packet (forward channel reject) indicates that the port originating that packet has received a frame on the forward channel containing a send sequence number which did not match the expected number. The instruction field portion of that packet contains the receive sequence number N(R) of the expected frame.

The above packets are used to control data flow on the reverse channel. Subscriber reverse channel traffic arriving at a port on the network is assembled into frames and transmitted to the central computer on the reverse channel. Frames are transmitted from station to station and frames received error free at any station are passed along to the next station. Each station maintains a received sequence count N(R) which is the number of the next expected frame to be received on the primary channel. Each station also maintains a send sequence count N(S) which is the number of the next frame to be transmitted on the forward channel. If a station receives a frame containing a sequence error, the frame is rejected and N(R) is not incremented for this frame or any which follow until a frame arrives containing the correct N(S). Upon occurrence of a sequence error, the receiving station immediately transmits an RREJ frame on the reverse channel towards the station which transmitted the frame originally. Upon receipt of that frame, the transmitting station retransmits all traffic beginning with the frame N(R) which was included in the RREJ frame just received. Each station maintains a timer which has a period greater than the loop transmission time to the next station. For each frame transmitted, this timer is reset to the period. If the timer should expire with frames outstanding, the transmitting station will transmit a supervisory frame with the poll bit set requesting the receiving station to respond with N(R). If a transmitting station receives an RRNR frame, it suspends transmission until a RRR frame is received.

The foregoing detailed description has been given for clearness of understanding only and no unnecessary limitations should be understood therefrom as a number of modifications will be obvious to those skilled in the art. For instance, while telephone lines have been discussed herein as the main transmission conduit, other long distance communications media capable of equally economically handling kilobit per second data rates could be substituted.

We claim:

1. A rapidly responsive, real-time interactive, computer-based education system comprising:
   central computer means for storing and executing interactive educational software and providing a forward channel data flow, said forward channel data flow including digital code sequences indicative of data to be displayed by a receiving display terminal, the forward channel data flow rate of said digital code sequences per receiving display terminal averaging hundreds of bits per second:
   a plurality of remotely located, keyboard actuated display terminals, each said display terminal receiving certain code sequences from such forward channel data flow, displaying data represented thereby and providing as an output, real-time user responses to said displayed forward channel data in the form of keystroke data, the flow rate of said keystroke data averaging tens of bits per second;
   high speed communications means dedicated to unidirectionally transmitting said forward channel data flow to said display terminals, said communications means including uplink-satellite transmitting means and at least one downlink satellite recevie-only means; and
   land-based communication means including a reverse channel for transmitting said keystroke data from each said display terminal to said central computer means whereby said computer means responds to said key stroke data in its execution of said interactive educational software.

2. The invention of claim 1 wherein said high speed communications means transmits data at a megabit per second rate and said land based communications means transmits data at a kilobit per second rate, whereby high speed communications means provides sufficient data flow to accomodate thousands of display terminals whereas said land based communications means provides data handling capacity for hundreds of display terminals;

3. The invention defined in claim 2 wherein the rate of data flow per receiving display terminal in said reverse channel is approximately ten percent or less of the rate of data flow in said forward channel.

4. The invention as defined in claim 3 wherein said land based communications means comprise telephonic land lines.

5. The invention as defined in claim 4 wherein said forward and reverse channel data flows comprise multiplexed, limited length, data frames containing no more than a preset messge length for or from each terminal, said message length limitation allowing the system to exhibit rapid interactive response characteristics.

6. The invention as defined in claim 5 wherein said central computer means, after transmitting a preset plurality of data frames to said access means, sends a special frame which requests said access means to acknowledge receipt of said special frame.

7. A rapidly responsive, real-time interactive, computer-based education system comprising:
   central computer means adapted to store and execute interactive educational software and to provide a forward channel data flow, said data flow being in the form of multiplexed end to end data frames, each frame including data and a header, said header designating an intended display terminal for said data, said data flow to said intended display terminal being at an average rate of hundreds of bits per second;

a plurality of remotely located, keybord actuated. user display terminals for receiving designated data frames, displaying the data contained therein and providing as an output, real-time user responses to said displayed dat in the form of keystroke data, said keystroke data flow rate being at an average rate of tens of bits per second;

high speed communications means dedicated to unidirectionally transmitting said forward channel data flow to said terminals at a megabit per second data rate, said communications means including uplink-satellite transmitting means and at least one downlink satellite receiving means; and land-based communication means including a reverse channel for transmitting at a kilobit per second data rate said keystroke data from said plurality of display terminals to said computer means whereby said central computer means responds to said key stroke data in its execution of said interactive educational software.

8. The invention as defined in claim 7 wherein said downlink satellite receiving means includes:

access means for distributing forward channel data to connected display terminals, said access means including means for sorting data frames based upon said header information.

9. The invention as defined in claim 8 wherein said access means receives and stores information from each connected display terminal and assembles reverse channel data packets from said information, each said data packet being limited to a preset amount of information notwithstanding the amount of information received from said terminals.

10. The invention as defined in claim 9, wherein said access means sequentially polls stored information received from each of its connected terminals, assembles and transmits limited data length, reverse channel data packets derived from said stored information and contines such sequential polling until all stored information from its connected display terminals has been configured into limited data length reverse channel data packets.

11. The invention as defined in claim 9 wherein said forward and reverse channel data flows comprise multiplexed, limited length, data frames containing no more than a preset message length for or from each terminal, said message length limitation allowing the system to exhibit rapid interactive response characteristics.

12. The invention as defined in claim 7 wherein each said data frame intended for a specific recipient is provided with a sequential frame number.

13. The invention as defined in claim 12 wherein each said downlink satellite receiving means includes an antenna, and link access means connected between said antenna and a plurality of said display terminals, and further connected to telephone line communications means, said link access means including means for storing the frame number of an expected next data frame for a specific recipient and providing a signal to said telephone line communications means only when a received sequential frame number does not match said stored, expected data frame number.

14. The invention as defined in claim 13 wherein said central computer means, after transmitting a preset plurality of data frames to said link access means, sends a special frame which requests said link access means to acknowledge receipt of said special frame.

15. A method for providing economical computer based education comprising:

storing interactive educational software in a computer;

providing an output stream of data to be displayed from said computer to a plurality of remotely located, keyboard actuated display terminals via a one-way satellite data link at multimegabit per second rates; and providing an input stream of user keystroke data from said terminals to said computer via a land based communication link at kilobit per second rates, said keystroke data being generated in response to the display of parts of said output stream of data by said display terminals×whereby said computer alters said output stream of data in response to said input stream of user key stroke data.

* * * * *

UNITED STATES PATENT AND TRADEMARK OFFICE
CERTIFICATE OF CORRECTION

PATENT NO. : 4,793,813
DATED : December 27, 1988
INVENTOR(S) : Donald L. Bitzer, et al It is certified that error appears in the above—identified patent and that said Letters Patent is hereby corrected as shown below:

On the title page
Inventor's Name: David L. Bitzer, should be, DONALD L. BITZER

Signed and Sealed this

Twenty-sixth Day of September, 1989

Attest:

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,793,813
DATED : December 27th 1988
INVENTOR(S) : Donald L. Bitzer et al It is certified that error appears in the above-identified patent and that said Letters Patent is hereby corrected as shown below:

Col 12, Claim 5, line 4, "messge" should read -- message --.
Col 13, Claim 7, line 12, "actuated." should read -- actuated --.
Col 13, Claim 7, line 16, "dat" should read -- data --.
Col 14, Claim 15, line 15, "X" should be deleted.

Signed and Sealed this

Tenth Day of August, 1993

Attest:

MICHAEL K. KIRK

Attesting Officer

Acting Commissioner of Patents and Trademarks